US008963921B1

(12) United States Patent
Côté et al.

(10) Patent No.: US 8,963,921 B1
(45) Date of Patent: Feb. 24, 2015

(54) TECHNIQUE FOR ENHANCED PERCEPTION OF 3-D STRUCTURE IN POINT CLOUDS

(75) Inventors: Stéphane Côté, Lac Beauport (CA); Renaud Gervais, Quebec (CA)

(73) Assignee: Bentley Systems, Incorporated, Exton, PA (US)

(*) Notice: Subject to any disclaimer, the term of this patent is extended or adjusted under 35 U.S.C. 154(b) by 350 days.

(21) Appl. No.: 13/287,795

(22) Filed: Nov. 2, 2011

(51) Int. Cl.
*G06T 15/50* (2011.01)
*G06T 15/60* (2006.01)

(52) U.S. Cl.
USPC ........................................................ 345/426

(58) Field of Classification Search
None
See application file for complete search history.

(56) References Cited

U.S. PATENT DOCUMENTS

| 5,513,276 | A * | 4/1996 | Theodoracatos | 382/154 |
| 5,988,862 | A | 11/1999 | Kacyra et al. | |
| 2008/0238836 | A1* | 10/2008 | Uchino et al. | 345/76 |
| 2009/0103773 | A1 | 4/2009 | Wheeler et al. | |
| 2009/0231327 | A1 | 9/2009 | Minear et al. | |
| 2010/0207936 | A1 | 8/2010 | Minear et al. | |
| 2010/0208981 | A1* | 8/2010 | Minear et al. | 382/154 |
| 2011/0115812 | A1 | 5/2011 | Minear et al. | |
| 2011/0187704 | A1* | 8/2011 | Chen et al. | 345/419 |
| 2011/0187716 | A1* | 8/2011 | Chen et al. | 345/427 |
| 2011/0187723 | A1* | 8/2011 | Chen et al. | 345/473 |
| 2011/0194270 | A1* | 8/2011 | Di Trapani et al. | 362/2 |

OTHER PUBLICATIONS

"Bentley Descartes V8i (SELECTseries 2) Help," Bentley Systems, Incorporated, Jul. 16, 2010, pp. 1-53.
"MicroStation V8i (SELECTseries 2) Help," Bentley Systems, Incorporated, Jul. 8, 2010, Selected Pages pp. 1-77.

* cited by examiner

*Primary Examiner* — David Zarka
*Assistant Examiner* — Khoa Vu
(74) *Attorney, Agent, or Firm* — Cesari and McKenna, LLP

(57) ABSTRACT

In one embodiment, a user's perception of three-dimensional (3-D) structure of points in a point cloud is enhanced by use of a flashlight virtual object. The flashlight virtual object has a field of view that includes an inner cone that encloses an inner zone and an outer cone that encloses an outer zone. A current position and orientation of the flashlight virtual object within the 3-D space of the point cloud is found. It is determined whether the any points of the point cloud fall within the inner cone of the flashlight virtual object, and, if so, the points of the point cloud that fall within the inner cone are highlighted. It is further determined whether any points of the point cloud fall within the outer cone of the flashlight virtual object, and, if so, the points of the point cloud that fall within the outer cone are highlighted.

26 Claims, 7 Drawing Sheets

TECHNIQUE FOR ENHANCED PERCEPTION OF 3-D STRUCTURE IN POINT CLOUDS

BACKGROUND

1. Technical Field

The present disclosure relates to techniques for enhancing a user's perception of the three dimensional structure of a representation on a display screen, and more specifically, to techniques for enhancing a user's perception of the three dimensional structure of a point cloud displayed in a display screen.

2. Background Information

Three-dimensional (3-D) laser scanners are increasingly being used to accurately and quickly capture the shape of physical subjects, such as discrete objects, portions of structures, terrain, or other parts of the physical environment. Such scanners capture a point cloud of geometric samples on the surface of the subject. To accomplish such task, a 3-D laser scanner typically emits some form of coherent light and detects its reflection is from the surface of the physical subject. Some 3-D laser scanners rely on time-of-flight. In a time-of-flight 3-D laser scanner, a laser emits pulses of coherent light in a grid-like pattern to scan the physical subject. A laser rangefinder finds the distance to the surface of the physical subject for each pulse of coherent light by timing the round-trip-time of the pulse of light, from its emission, to its reflection back to the laser rangefinder. Other 3-D laser scanners rely on some form of triangulation Like a time-of-flight 3-D laser scanner, a triangulation 3-D laser scanner also emits coherent light in a grid-like pattern to scan the physical subject. However, rather than measure time-of flight, an offset camera is employed to look for the location where the coherent light strikes the subject (i.e. a laser dot). Depending on how far away the coherent light strikes the surface, the laser dot appears at different places in the camera's field of view, which can be used in a triangulation calculation to determine distance.

In either case, a point cloud of geometric samples is produced by repeated application of the technique, where each point of the point cloud is associated with a particular x-axis, y-axis and z-axis position on the surface of the physical subject. The points of the point cloud can be used to extrapolate the shape of the physical subject, which may be translated into a more readily used form through a reconstruction process. In reconstruction, the points of the point cloud are often used to construct a vector-based model, where the subject is represented by vector elements based on mathematical formulas, rather than on a large number of discrete points. Creating a vector-based model from a point cloud is generally a difficult process that requires at least some user-involvement in selecting which points of the point cloud should be used as the basis for vector elements. A user may be shown a rendition of the point cloud on a display (e.g., a conventional 2-D display screen) of a computer system. He or she may then be called upon to "draw" vector elements (e.g., lines, polygons, etc.) using points of the point cloud as a guide. To "draw" vector elements, a user may manipulate a cursor (e.g., using a conventional 2-D mouse) to select and "snap" to a first point of the point cloud. The user may then move the cursor (e.g., "drag" the cursor) from this first point to one or more other points that are selected and "snapped" to. Collectively, the "snapped" to points may define the bounds of the vector element, with the x-axis, y-axis and z-axis position in 3-D space of the "snapped" to points assigned to the relevant portions of the vector element.

Unfortunately, there are a number of issues which complicate reconstruction. When displayed on a conventional 2-D display screen, a point cloud typically appears completely flat. While each point in the point cloud may represent data at a different distance in 3-D space from a viewing position in the 3-D space, when displayed on a conventional 2-D display screen, most systems show the points without perspective effects, and therefore they are all represented by dots of the same size. Absent visual depth information, a user is generally unable to discern how far away from the viewing position a point is in 3-D space, without time-consuming additional operations.

This issue is compounded by the fact that point clouds are often discontinuous. Points that visually appear proximate to each other on a 2-D display screen may not be part of the same surface in 3-D space, but may instead be derived from surfaces in that simply happen to be aligned with respect to the viewing position in 3-D space. A point from a deeper surface may be shown next to a point from a closer surface, simply because those surfaces "overlap" when viewed from a certain perspective. Accordingly, a user generally is unable to definitively determine whether two points are part of the same surface or are parts of different surfaces, without time-consuming additional operations.

The above discussed lack of depth information and discontinuities of point clouds may cause "snapping" to points to be a frustrating process for a user. For example, a user may select a first point to begin a vector element that the user guesses is at a desired depth. However, without time-consuming additional operations, the user cannot be cerin tain their selection is actually at the depth intended. The user may then select a second point to terminate the vector element that the user guesses is also at the desired depth. As with the first point, the user cannot be certain their selection is actually at the depth intended. Further, due to the discontinuous nature of point clouds, the user cannot be certain that the second point is even part of the same surface as the first point. Even worse, if the user happens to move the cursor to an ambiguous location that is between two different points, that are part of surfaces at different depths, the user's selection may jitter (for example, due to tiny inadvertent mouse movements) between points of different surfaces. The user may be unaware this is even occurring.

To have some assurance that a vector element begins and ends at points of an intended depth that are part of the same surface, a user may have to first "draw" the vector element, and then rotate the point cloud, to see the point cloud and the vector element from a different viewing position in 3-D space. If it appears the vector element was "drawn" from some point too near or too far, the user may have to repeat the process, selecting different points, and then rotating the point cloud to see if these new selections produce better results. Such repetitive time-consuming operations may prove frustrating to the user, who may be forced to spend an inordinate amount of time in reconstructing a vector-based model from a point cloud.

Various techniques have been proposed in attempts to address these issues, but have meet with limited success. Some techniques have sought to "clip" point clouds to limit the possible points a user can "snap" to. However, "clipping" a point cloud is a processing intensive operation. Further, "clipping" a point cloud does not change the fundamental issue of a lack of depth information being conveyed to the user. It merely masks some of the adverse effects of the lack of depth information. Other techniques have sought to render points of point clouds in different colors depending on their height above some plane in 3-D space, such as the ground.

However, while this may be helpful in some situations, it provides little help in others. For example, points that are located on different surfaces that happened to be located about the same height off the plane (e.g., the ground) will be rendered in the same color. A user attempting to distinguish between the points on each surface would receive little help from the color indications. Still other techniques have sought to display point clouds in three dimensions, using three-dimensional stereo visualization equipment. However, three-dimensional stereo visualization equipment is expensive and not widely deployed. Accordingly, such an approach may be impracticable with the present state of technology.

What is needed is a technique that enhances a user's perception of the three dimensional structure of a representation (e.g., a point cloud) such that a user may quickly and accurately select portions of the representation (e.g., points), for example to be "snapped" to.

SUMMARY

In one embodiment, the shortcomings of the prior art are addressed by a special tool comprising a 3-D virtual object based on a flashlight paradigm. The 3-D virtual object based on a flashlight paradigm (hereinafter referred to as the "flashlight virtual object") produces highlighting effects upon points of a representation (e.g., a point cloud) within a specific field of view, such that it appears to emit a stream of light in the manner of a physical flashlight. The user may manipulate the position and orientation of the flashlight virtual object in the 3-D space of the representation (e.g., point cloud). As this occurs, the highlighted points may change in near-real time, thereby simulating the behavior of a physical flashlight moving in relation to physical objects. The highlighting effects provide a visual indication of depth and surface continuity to a user viewing a representation in a user interface on, for example, a 2-D display screen.

In some embodiments, the flashlight virtual object includes an integrated target (e.g., a snap target) that may be utilized by the user to select, and in some implementations "snap" to a portion (e.g., point) of the representation (e.g., the point cloud) whose depth and surface membership have been visually indicated by the highlighting effects. For instance, the user may place the snap target proximate to a desired portion (e.g., point) and then activate an interface element of an input device to select and "snap" to that portion (e.g., point). The flashlight virtual object may enhance the user's perception of the 3-D structure of the representation (e.g., the point cloud), sufficiently such that the user need not change viewing position in 3-D space to verify depth prior to selection and "snapping."

BRIEF DESCRIPTION OF THE DRAWINGS

The detailed description below refers to the accompanying drawings of example embodiments, of which.

DETAILED DESCRIPTION

Figure 1:
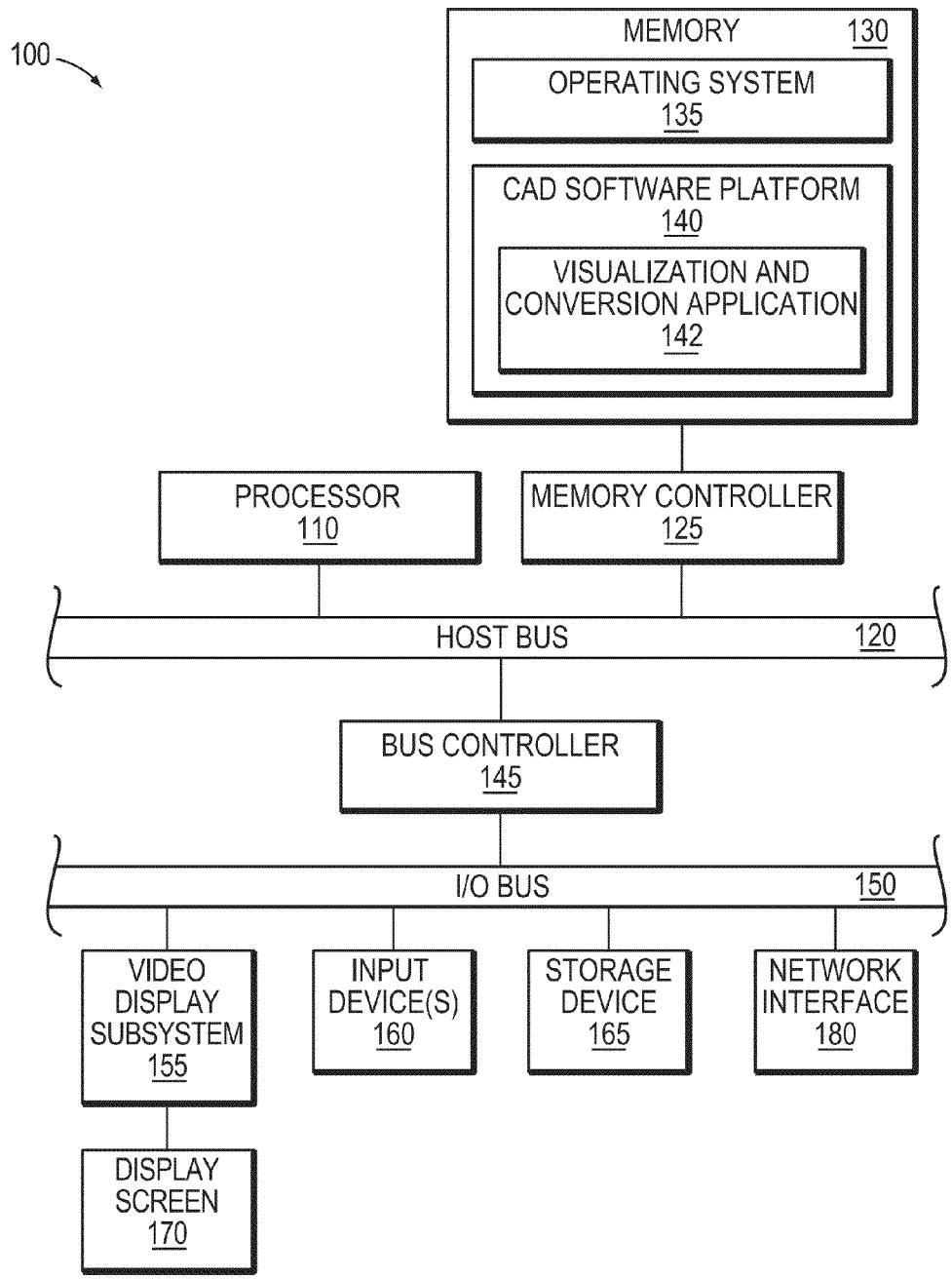
FIG. 1 is a block diagram of an example electronic device (e.g., a computer), in which at least some of the presently described techniques may be employed.

FIG. 1 is a block diagram of an example electronic device 100, (e.g., a computer), in which at least some of the presently described techniques may be employed. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 125. The memory 130 is configured to store at least a portion of computer-executable instructions and data for an operating system 135 while the electronic device 100 is operating. In addition, the memory 130 may store at least portions of a computer aided design (CAD) software platform 140 on which a wide variety of task-specific applications may be based. The CAD software platform 140 may provide base functionality relating to object management, geometric relationships, information and standards management, visualization, drawing and report extraction, and the like. In one embodiment, the CAD software platform is the MICROSTATION® V8i CAD software platform, available from Bentley Systems Inc. A number of task-specific applications, including a visualization and conversion application 142 that includes functionality and tools for raster-to-vector conversion, may provide additional functionality leveraging the base functionality of the CAD software platform 140. In one embodiment, the visualization and conversion application 142 is the BENTLEY® Descartes visualization and conversion application, available from Bentley Systems Inc.

The host bus 120 of the electronic device 100 is coupled to an input/output (I/O) bus 150 through a bus controller 145. A video display subsystem 155 may include a discs play screen 170, such as a 2-D display screen, and hardware to drive the display screen. The video display subsystem 155 is coupled to the I/O bus 150. The display screen 170, among other functions, may show a user interface of the visualization and conversion application 142. One or more input devices 160, such as a keyboard, a 2-D mouse, a 3-D pointing device, etc., are provided and used for interaction with the electronic device 100, and the visualization and conversion application 142 executing on the electronic device. A persistent storage device 165, such as a hard disk drive, a solid-state drive, or other type or persistent data store, is coupled to the I/O bus 150, and may persistently store computer-executable instructions and data, that are available to be loaded to the volatile memory 130 when needed. For example, computer-executable instructions and data for the operating system 135, and the CAD software platform 140, and the visualization and conversion application 142, may be stored in the persistent storage device 165. The I/O bus 150 may further be coupled to a network interface 180 that interfaces with a computer network (not shown). The computer network may allow communication between the electronic device 100 and other devices, using any of a number of well known networking protocols, including wireless networking protocols, to permit a variety of distributed, collaborative or remote computing configurations.

A user may utilize a user interface of the above mentioned visualization and conversion application 142 to view on the display screen 170 a representation, e.g., a point cloud. The point cloud may be composed of geometric samples descriptive of the shape of a physical subject, such as a discrete object, portions of a structure, terrain, or other parts of the physical environment. The geometric samples may be captured by a 3-D laser scanner or other device. Using the point cloud as a starting point, the user may utilize one or more tools provided in the user interface to reconstruct a vector-based model that may be more readily utilized by applications of the CAD software platform 140. According to a semi-automated approach, the user may use the one or more tools to "snap" to selected points in the point cloud and "draw" vector elements, manipulating the tools with an input device 160, such as a 2-D mouse.

According to an embodiment of the present disclosure, a special tool comprising a flashlight virtual object may be provided within the user interface of the visualization and conversion application 142. The flashlight virtual object may produce highlighting effects upon points of a point cloud within a specific field of view, such that it appears to emit a stream of light in the manner of a physical flashlight. The user may manipulate the position and orientation of the flashlight virtual object in the 3-D space of the point cloud, using the input device 160, for example, by moving a 2-D mouse. As this occurs, the highlighted points may change in near-real time, thereby simulating the behavior of a physical flashlight moving in relation to physical objects. The highlighting may provide a visual indication of depth and surface continuity.

The flashlight virtual object may also include a snap target that may be utilized to select a point of the point cloud whose depth and surface membership have been visually indicated by the highlighting effects. Using the input device, for example, clicking a button of the 2-D mouse, the user may "snap" to a point of the point cloud located proximate the snap target, to begin "drawing" a vector element. One or more additional points may be selected in similar manner to define the further extent of the vector element. The flashlight virtual object may enhance the user's perception of the three dimensional structure of points in the point cloud when displayed on the display screen 170, sufficiently such that the user need not change viewing position with respect to the point cloud to verify the appropriate selection of points to snap to.

Figure 2:
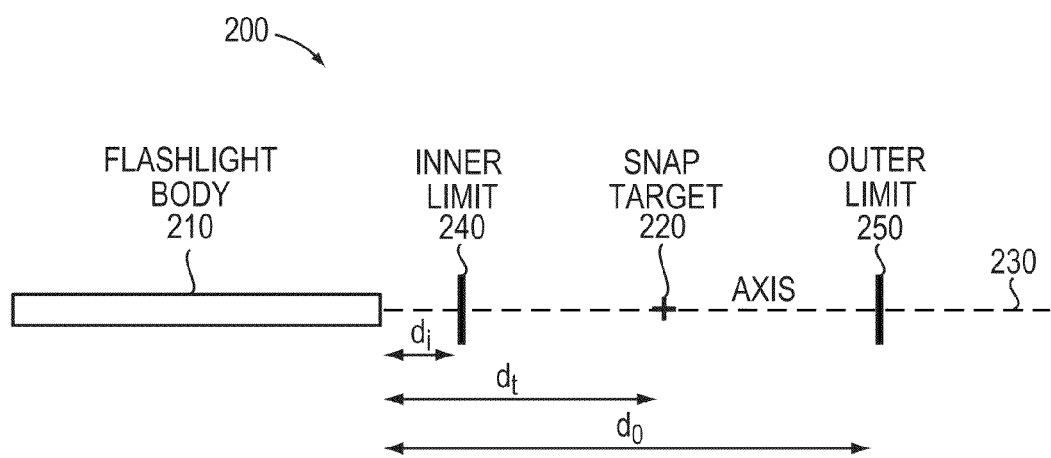
FIG. 2 is a schematic diagram of an example flashlight virtual object that may be provided within the user interface of the visualization and conversion application.

FIG. 2 is a schematic diagram of an example flashlight virtual object 200 that may be provided within the user interface of the visualization and conversion application 142. The flashlight virtual object 200 may include a body 210, and a snap target 220 located a linear distance ($d_t$) ahead of the body 210 along an axis 230. The axis 230 may be graphically displayed within the user interface such that the user can see the position and orientation of the flashlight virtual object. The graphic display may, for example, take the form of a colored line segment that extends as far as the snap target 220. Alternatively, the graphic display may take the form of a line that extends to infinity. In some implementations, the body 220 may be graphically displayed within the user interface as an icon reminiscent of a physical flashlight. In other implementations, no graphical display may be provided for the body. Similarly, in some implementations the snap target 230 may be graphically displayed within the user interface as a small sphere. In other implementations, a different representation, or no representation may be provided. When the flashlight virtual object is positioned proximate to points of a point cloud within the user interface of the visualization and conversion application 142, highlighting effects are imposed upon points within a field of view, such that it appears that a stream of light is being emitted upon points within the field of view. The field of view is disposed generally along the axis 230, between an inner limit 240 located at a distance ($d_i$) from the body 210 and an outer limit 250, located at a distance ($d_o$) from the body 210.

While the field of view may be shaped in a variety of different manners, in one embodiment, the field of view is shaped as a pair of cones. An inner cone of the pair may have its base at the inner limit 240 and its apex at the snap target 220. An outer cone of the pair may have its base at the outer limit 250 and its apex at the snap target 220. The axis of both cones may be aligned along the axis 230 of the flashlight virtual object 200.

Figure 3:
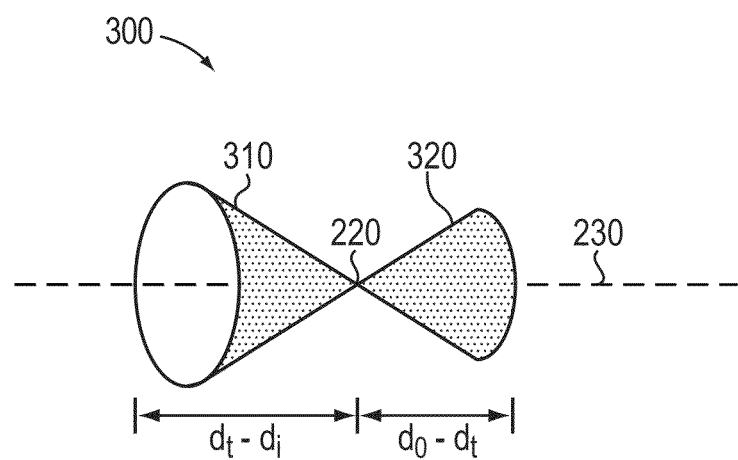
FIG. 3 is a schematic diagram of an example field of view of the example flashlight virtual object, where the field of view is shaped as a pair of cones.

FIG. 3 is a schematic diagram of an example field of view 300 of the example flashlight virtual object 200, where the field of view 300 is shaped as a pair of cones. The inner cone 310 is characterized by a height ($d_t$-$d_i$) from the inner limit 240 to the snap target 220 and encloses an inner zone. The outer cone 320 is characterized by a height ($d_o$-$d_t$) from the outer limit 240 to the snap target 220 and encloses an outer cone. Each cone may have an identical opening angle (A) (see FIG. 4), or, in some implementations, different opening angles.

Figure 4:
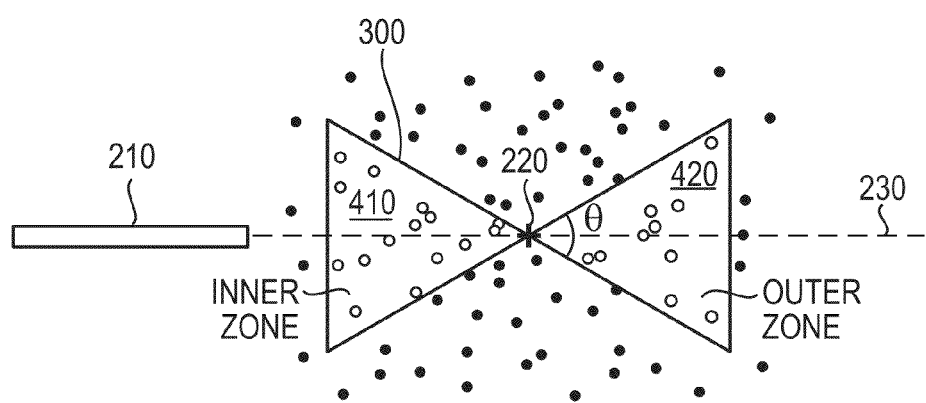
FIG. 4 is a schematic diagram of a cross section of an example field of view of the example flashlight virtual object, shown disposed among points of a point cloud.

FIG. 4 is a schematic diagram of a cross section of an example field of view 300 of the example flashlight virtual object 200, shown disposed among points of a point cloud. When the flashlight virtual object 200 is activated within the user interface of the visualization and conversion application 142, all points of the point cloud which fall within the inner zone 410 (defined by the inner cone 310) may be highlighted with a first color ($C_i$), for example, by changing a pixel color assigned to the points. All points of the point cloud which fall within the outer zone 420 (defined by the inner cone 320) may be highlighted with a second color ($C_o$) in similar manner. In one implementation, the first color ($C_i$) is green and the second color ($C_o$) is red. Alternatively, the first color ($C_i$) and second color ($C_o$) may be any of a variety of other colors, including the same color. As the user moves the flashlight virtual object 200 within the point cloud, the points of the point cloud that fall within the two enclosed zones 410, 420 change. As this occurs, the points of the point cloud that are highlighted are updated in substantially real-time, to approximate the appearance of a real flashlight being moved while shining upon among real objects.

As the user moves the flashlight virtual object 200, the snap target 220 may approach, and eventual move across, a surface (or surfaces) represented by points in the point cloud. As the flashlight virtual object approaches the surface, the outer cone 320 may intersect the surface and points on the surface within the outer zone 420 may be highlighted with the second color ($C_o$), e.g., red. This may create the effect of a highlighted "spot" being displayed. If the user moves the flashlight virtual object 200 closer to the surface, such that the snap target approaches the surface, the portion of the surface intersected by the outer cone will become smaller and smaller, given the decreasing cross section of the outer cone 320 being intersected. Therefore, the highlighted "spot" on the surface will decrease in size. Eventually, when the surface passes through the snap target 220, the highlighted "spot" will disappear, as no points on the surface fall within either the outer or inner zones. If the user makes a snap selection when the "spot" has disap-peared, a point on the surface closest to the snap target 220 will be snapped to. If the user moves the flashlight virtual object 200 further forward, such that the snap target 220 is disposed beyond the surface, the inner cone 310 may intersect the surface and points on the surface within the inner zone 410 may be highlighted with the first color ($C_i$), e.g., green. Again, a highlighted "spot" may be displayed, increasing in size as the flashlight virtual object is moved further forward. In this manner, a visual display may be produced that conveys depth and surface continuity information to the user, allowing the user to select a desired point and "snap" to it.

Figure 5:
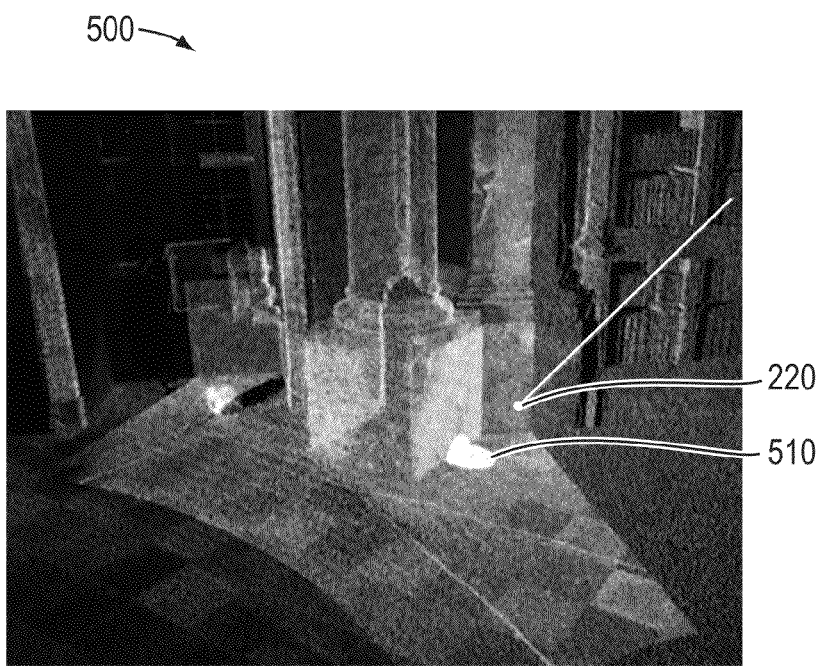
FIG. 5 is screen shot of an example flashlight virtual object approaching surfaces within an example point cloud representing the interior of a structure.

FIG. 5 is a screen shot 500 of an example flashlight virtual object 200 approaching surfaces within an example point cloud representing the interior of a structure. A user may manipulate an input device 160, for example, by moving a 2-D mouse, to bring the flashlight virtual object towards the surface. As this occurs, and the snap target 220 approaches the surface, a highlighted "spot" 510 is displayed. In this example, points that define a portion of a floor and a column (which collectively form surfaces) are highlighted. The user may, with the input device 160, move the flashlight virtual object 200 closer such that the highlighted "spot" will decrease in size and eventually disappear as the snap target intersects the surfaces. If the user makes a snap selection at that moment, a point on the surface closest to the snap target 220 will be snapped to, in this example, a point on the floor near that base of the column. If the user moves the flashlight virtual object 200 further forward, a highlighted "spot" again may be displayed, increasing in size as the flashlight virtual object is moved further forward.

Figure 6:
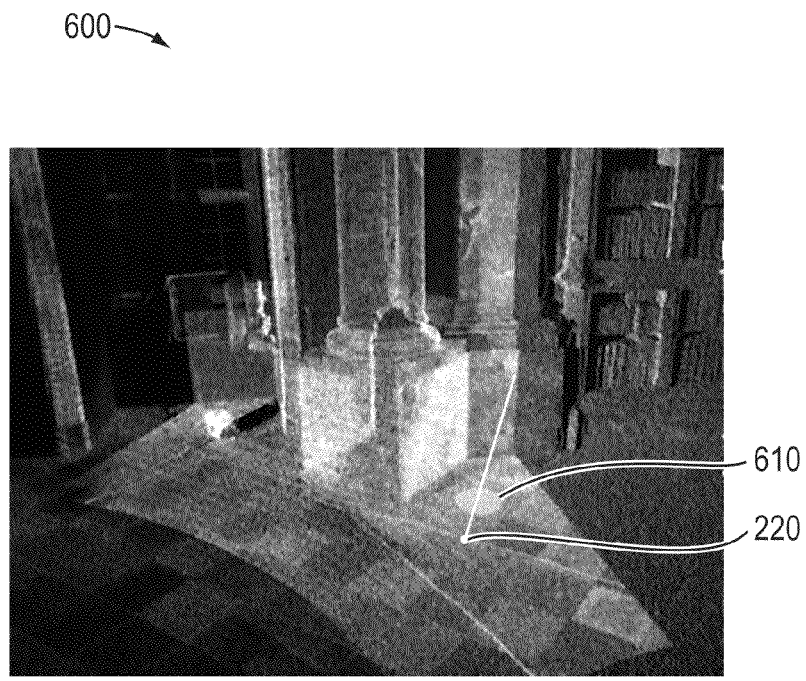
FIG. 6 is a screen shot of the example flashlight virtual object passing a surface within the example point cloud of FIG. 5.
Figure 7:
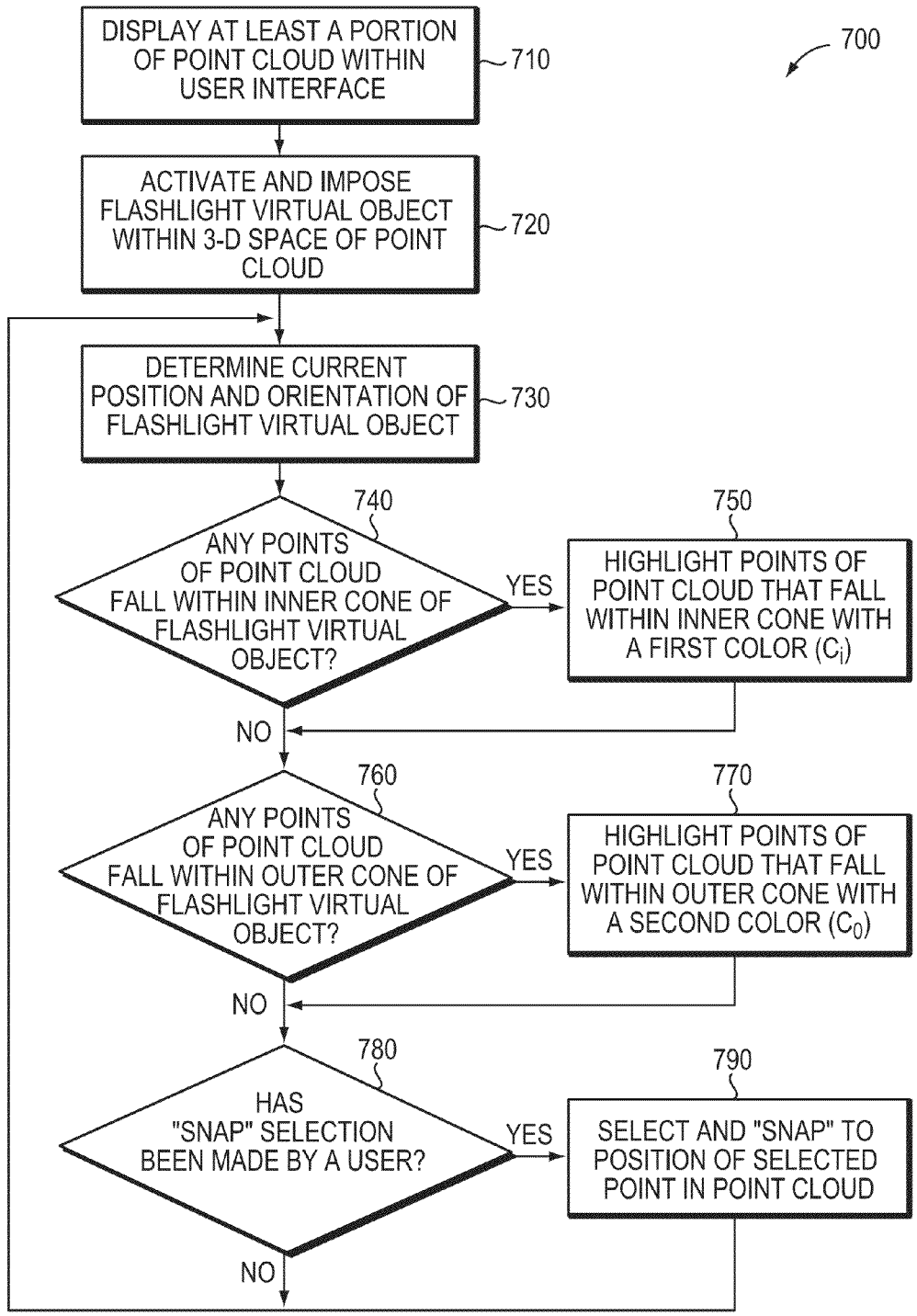
FIG. 7 is a sequence of steps for enhancing a user's perception of the three dimensional structure of points in a point cloud, according to one embodiment of the presently described techniques.

FIG. 6 is a screen shot 600 of the example flashlight virtual object passing a surface within the example point cloud of FIG. 5. As the occurs, and the snap target 220 passes further beyond the surface, a highlighted "spot" 610 is again displayed. In this example, points that define a portion of the floor are highlighted. A differing color of this highlighted spot (e.g., red as opposed to green) may help signal to the user that he or she has passed through the surface. In this manner a user may rapidly perceive when the snap target 220 is moved to the desired "snapping" depth, as well as surface continuity information FIG. 7 is a sequence of steps 700 for enhancing a user's perception of the three dimensional structure of points in a point cloud, according to one embodiment of the presently described techniques. At step 710, at least a portion of the point cloud is displayed on the display screen 170 within the user interface of the visualization and convers sion application 142. Each point of the point cloud is associated with a position in 3-D space. At step 720, a flashlight virtual object is activated and imposed within the 3-D space of the point cloud being displayed within the user interface of the visualization and conversion application 142. At step 730, a current position and orientation of the flashlight virtual object 200 is determined within the 3-D space. At step 740 a determination is made whether any points of the point cloud fall within an inner cone of the flashlight virtual object 200, the inner cone having its base at an inner limit 240 and its apex at a snap target 220. If so, at step 750 points of the point cloud which fall within the inner zone 410 are highlighted with a first color ($C_i$). At step 760 a determination is made whether any points of the point cloud fall within an outer cone of the flashlight virtual object 200, the outer cone having its base at an outer limit 250 and its apex at a snap target 220. If so, at step 770 points of the point cloud which fall within the outer zone 420 are highlighted with a second color ($C_o$). At step 770 a determination is made whether a "snap" selection has been made by a user. At step 780, if so, a point closest to the snap target 220 will be "snapped" to, the position of the point to be used as the position for a portion of a vector element, for example, as the position for the beginning or the ending of a line. Steps 730-790 may be repeated, with the user moving the flashlight virtual object to examine the point cloud and select and "snap" to additional points.

While the above description discusses various embodiments of the present disclosure, it should be apparent that a number of modifications and/or additions may be made without departing from the disclosure's intended spirit and scope.

While much of the above description discusses an example where the flashlight virtual object 200 is used with a point cloud during a reconstruction process, it should be understood that the flashlight virtual object may be used to visually convey depth and surface continuity information for a variety of other types of representations, including representations that are not based on a collection of points. For example, the flashlight virtual object may alternatively be utilized with elements of a 3-D CAD model, triangles of a triangle-mesh of a terrain elevation model, or any of a variety of other types of representations that may be shown within a user interface of an application. In general, at least a part of a representation may be displayed and the flashlight virtual object activated and imposed within 3-D space of that part of the representation. A current position and orientation of the flashlight virtual object is determined within the 3-D space. A determination is made whether any portion of the representation falls within an inner zone of the flashlight virtual object 200, and, if so, that portion is highlighted with a first color ($C_i$). Similarly, a determination is made whether any portion of the representation falls within an outer zone of the flashlight virtual object 200 and, if so, that portion is highlighted with a second color ($C_o$). Further, a determination may be made whether a user has entered a selection. If so, an element (e.g., a point, a vector element, etc) closest to the snap target 220 may be selected and, in some cases, a position of that element returned. These operations may be repeated, with the user moving the flashlight virtual object to examine the representation and, possibly, make selections.

While much of the above description discusses embodiments of the flashlight virtual object that include an integrated snap target, it should be understood that other embodiments may lack an integrated snap target. A snap target may simply not be provided, or may be provided by another object, separate from the flashlight virtual object. Similarly, other embodiments may include an integrated target of limited functionally. For example, a target may be provided that allows a user to select a point, but does not permit the user to "snap" some other type of element to that point.

While embodiments are discussed above in which the field of view 300 of the flashlight virtual object is shaped as a pair of cones, it should be understood that the field of view may be differently shaped. For example, the field of view may be shaped as a single cone, a pair of pyramids, a single pyramid or any of a variety of other shapes, while still achieving some or all of the above discussed advantages.

Furthermore, it should be understood that the above described techniques may be implemented in software, in hardware, or a combination thereof. A software implementation may include executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method for enhancing a user's perception of three-dimensional (3-D) structure of points in a point cloud, comprising:
displaying at least a portion of the point cloud within a user interface of an application shown on a display screen of an electronic device, each point of the point cloud associated with a position in 3-D space;
imposing a flashlight virtual object within 3-D space of the portion of the point cloud displayed within a user interface, the flashlight virtual object having a field of view that includes an inner cone that encloses an inner zone and an outer cone that encloses an outer zone, the inner zone and the outer zone disposed adjacent to, and on opposing sides of, a location where the inner zone and the outer zone meet;
determining a current position and orientation of the flashlight virtual object within the 3-D space;
determining whether any points of the point cloud fall within the inner zone of the flashlight virtual object, and, if so, highlighting the points of the point cloud that fall within the inner zone in the user interface; and
determining whether any points of the point cloud fall within the outer zone of the flashlight virtual object, and, if so, highlighting the points of the point cloud that fall within the outer zone in the user interface.

2. The method of claim 1, wherein the flashlight virtual object includes a target at the location where the inner zone and the outer zone meet, and the method further comprises:
determining a selection has been made by a user;
in response to the selection, selecting a point of the point cloud that is closest to the target.

3. The method of claim 2, wherein the target is a snap target and the method further comprises:
snapping to the selected point by using the position of the selected point as a position for a portion of a vector element.

4. The method of the claim 1, wherein the flashlight virtual object includes a body that is graphically represented in the user interface.

5. The method of claim 4, wherein the target is located a certain linear distance ahead of the body of the flashlight virtual object along an axis.

6. The method of claim 1, wherein the inner cone has a base at an inner limit and an apex at the location where the inner zone and the outer zone meet and the outer cone has a base at an outer limit and an apex at the location where the inner zone and the outer zone meet.

7. The method of claim 1, wherein the highlighting the points of the point cloud that fall within the inner zone highlights the points that fall within the inner zone with a first color, and the highlighting the points of the point cloud that fall within the outer zone highlights the points that fall within the outer zone with a different second color.

8. The method of claim 7, wherein the first color and the second color are each selected from the group consisting of: red and green.

9. The method of claim 1, further comprising:
after movement of the flashlight virtual object within the 3-D space, repeating the determining the current position and orientation, the determining whether the position of any points of the point cloud fall within the inner zone, and the determining whether any points of the point cloud fall within the outer zone, to update the points of the point cloud that are highlighted.

10. The method of claim 1, wherein the each point of the point cloud represents a geometric sample descriptive of the shape of a physical subject.

11. An apparatus to enhance a user's perception of three dimensional (3-D) structure of points in a point cloud, comprising:
a display screen configured to display a user interface;
a processor; and
a memory coupled to the processor and configured to store instructions for an application that is executable on the processor, the instructions for the application, when executed, operable to:
cause the display of at least a portion of the point cloud within the user interface, each point of the point cloud associated with a position in 3-D space,
impose a flashlight virtual object within the 3-D space of the portion of the point cloud displayed within the user interface, the flashlight virtual object having a field of view that includes an inner zone and an outer zone, the inner zone and the outer zone disposed adjacent to, and on opposing sides of, a target of the flashlight virtual object,
determine a current position and orientation of the flashlight virtual object within the 3-D space,
determine whether any points of the point cloud fall within the inner zone of the flashlight virtual object, and, if so, highlight the points of the point cloud that fall within the inner zone in the user interface, and
determine whether any points of the point cloud fall within the outer zone of the flashlight virtual object, and, if so, highlight the points of the point cloud that fall within the outer zone in the user interface.

12. The apparatus of claim 11, wherein the inner zone is enclosed by an inner cone that has a base at an inner limit and an apex at the target, and the outer zone is enclosed by an outer cone that has a base at an outer limit and an apex at the target.

13. The apparatus of claim 11, wherein the application, when executed, is further operable to:
determine a selection has been made by a user;
in response to the selection, select a point of the point cloud that is closest to the target.

14. The apparatus of claim 11, wherein the target is a snap target and the application, when executed, is further operable to:
snap to the selected point by using the position of the selected point.

15. The apparatus of claim 11, wherein points of the point cloud that fall within the inner zone are highlighted with a first color, and points of the point cloud that fall within the outer zone are highlighted with a different second color.

16. The apparatus of claim 11, wherein the points of the point cloud that are highlighted are updated in substantially real-time in response to movement of the flashlight virtual object.

17. A method for enhancing a user's perception of three-dimensional (3-D) structure of a representation, comprising:
displaying a representation within a user interface on a display screen of an electronic device, each portion of the representation associated with a position in 3-D space;
imposing a flashlight virtual object within the 3-D space of the representation displayed within the user interface, the flashlight virtual object having a field of view that includes an inner zone and an outer zone, the inner zone and the outer zone disposed on opposing sides of a location where the inner zone and the outer zone meet;

determining a current position and orientation of the flashlight virtual object within the 3-D space;

determining whether any portion of the representation falls within the inner zone of the flashlight virtual object, and, if so, highlight the portion of the representation that falls within the inner zone in the user interface; and determining whether any portion of the representation falls within the outer zone of the flashlight virtual object, and, if so, highlight the portion of the representation that falls within the outer zone in the user interface.

18. The method of claim 17, wherein the flashlight virtual object includes a target at the location where the inner zone and the outer zone meet, and the method further comprises:

determining a selection has been made by a user;

in response to the selection, selecting an element of the representation that is closest to the target.

19. The method of claim 17, further comprising:

returning a position of the selected element of the representation.

20. The method of claim 17, wherein the highlighting the portion of the representation that falls within the inner zone highlights the portion of the representation that falls within the inner zone with a first color, and the highlighting the portion of the representation that falls within the outer zone highlights the portion of the representation that falls within the outer zone with a different second color.

21. The method of claim 17, wherein the representation is a point cloud.

22. A non-transitory computer-readable medium that includes instructions executable on a processor, the instructions, when executed, operable to:

display a representation within a user interface, each portion of the representation associated with a position in 3-D space;

impose a flashlight virtual object within the 3-D space of the representation displayed within the user interface, the flashlight virtual object having a field of view that includes an inner zone and an outer zone, the inner zone and an outer zone disposed adjacent to, and on opposing sides of, a target of the flashlight virtual object;

determine a current position and orientation of the flashlight virtual object within the 3-D space;

determine whether any portion of the representation falls within the inner zone of the flashlight virtual object, and, if so, highlight the portion of the representation that falls within the inner zone in the user interface; and determine whether any portion of the representation falls within the outer zone of the flashlight virtual object, and, if so, highlight the portion of the representation that falls within the outer zone in the user interface.

23. The non-transitory computer-readable medium of claim 22, wherein the instructions, when executed, are further operable to:

determine a selection has been made by a user;

in response to the selection, select a portion of the representation that is closest to the target.

24. The non-transitory computer-readable medium of claim 22, wherein the inner zone is enclosed by an inner cone that has a base at an inner limit and an apex at the target and the outer zone is enclosed by an outer cone that has a base at an outer limit and an apex at the target.

25. The non-transitory computer-readable medium of claim 22, wherein the highlight the portion of the representation that falls within the inner zone highlights the portion of the representation that falls within the inner zone with a first color, and the highlight the portion of the representation that falls within the outer zone highlights the portion of the representation that falls within the outer zone with a different second color.

26. The non-transitory computer-readable medium of claim 22 wherein the representation is a point cloud.

* * * * *

UNITED STATES PATENT AND TRADEMARK OFFICE
CERTIFICATE OF CORRECTION

Page 1 of 1

| | |
|---|---|
| PATENT NO. | : 8,963,921 B1 |
| APPLICATION NO. | : 13/287795 |
| DATED | : February 24, 2015 |
| INVENTOR(S) | : Stephane Cote et al. |

It is certified that error appears in the above-identified patent and that said Letters Patent is hereby corrected as shown below:

In the Specification:
Col. 1, line 22 should read:
detects its reflection from the surface of the physical sub- Col. 1, line 30 should read:
ners rely on some form of triangulation. Like a time of flight Col. 2, line 30 should read:
tional operations, the user cannot be certain their selection Col. 4, line 45 should read:
video display subsystem 155 may include a display screen Col. 6, line 24 should read:
cone. Each cone may have an identical opening angle ($\theta$) (see Col. 6, line 65 should read:
disappeared, a point on the surface closest to the snap target Col. 7, line 44 should read:
user interface of the visualization and conversion applica- In the Claims:
Claim 6, Col. 9, line 50 should read:
zone and the outer zone meet, and the outer cone has a base at Signed and Sealed this
Seventh Day of July, 2015

Michelle K. Lee
*Director of the United States Patent and Trademark Office*